W. E. MILLER.
COLLAPSIBLE RIM.
APPLICATION FILED APR. 1, 1919.
1,423,811.
Patented July 25, 1922.
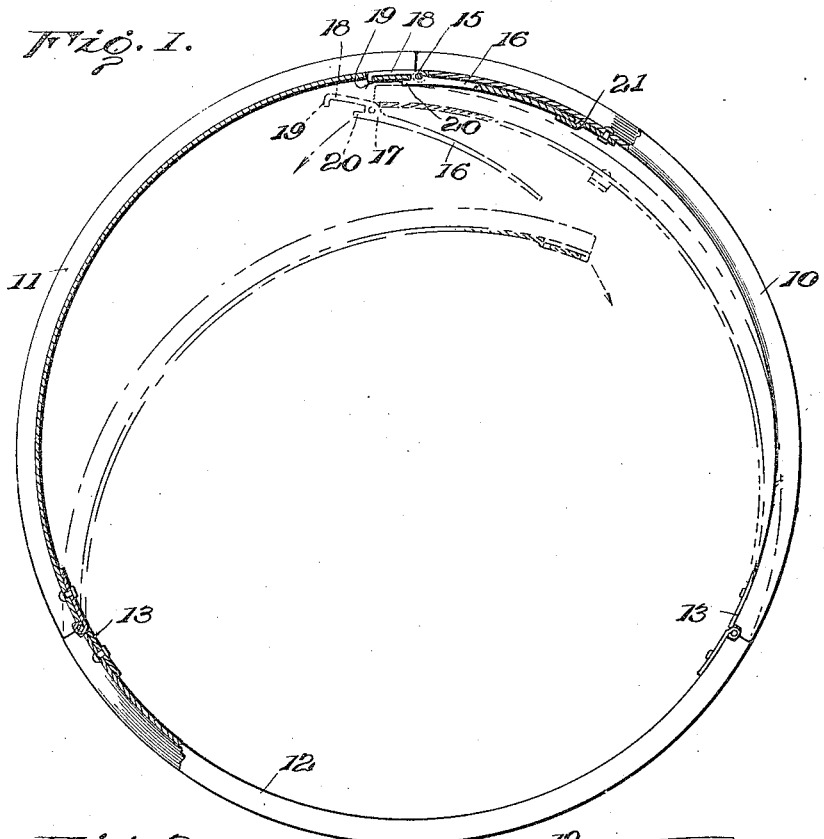
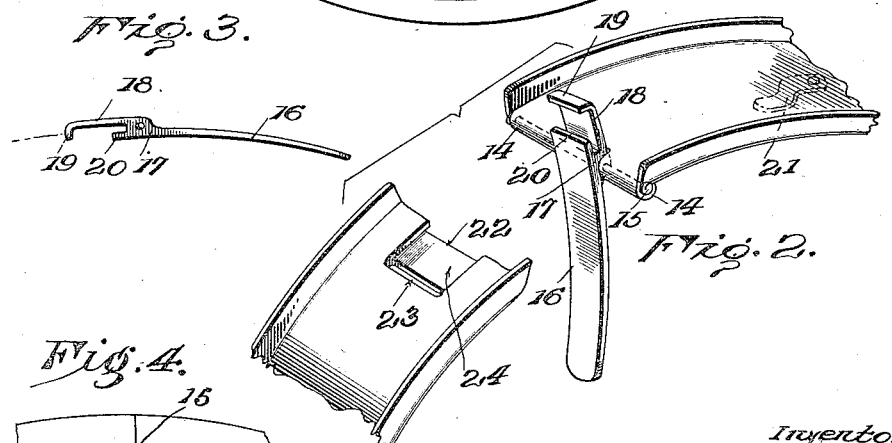
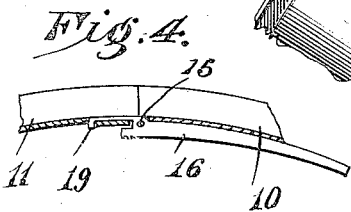
Inventor.
W. E. Miller.
by, Lacy & Lacy
Attorneys.

UNITED STATES PATENT OFFICE.

WILLIAM E. MILLER, OF SAVANNAH, GEORGIA.

COLLAPSIBLE RIM.

1,423,811.  Specification of Letters Patent.  Patented July 25, 1922.

Application filed April 1, 1919. Serial No. 286,711.

*To all whom it may concern:*

Be it known that I, WILLIAM E. MILLER, a citizen of the United States, residing at Savannah, in the county of Chatham and State of Georgia, have invented certain new and useful Improvements in Collapsible Rims, of which the following is a specification.

This invention relates to an improved collapsible rim for motor vehicles and has as its primary object to provide a rim wherein a tire may be placed upon or removed therefrom with a minimum of difficulty.

The invention has as a further object to provide a construction wherein a single connecting lever will be employed between the rim ends and wherein said lever may be swung to entirely free the rim ends with respect to each other so that the rim may be collapsed for freeing the tire.

And the invention has as a still further object to provide a construction wherein the connecting lever will normally unite the rim ends securely and will be locked against accidental release so that the rim will under all ordinary conditions, properly support the tire.

Other and incidental objects will appear hereinafter. In the drawings:

Figure 1 is a side elevation of my improved rim, parts being broken away and shown in section, Figure 2 is a fragmentary perspective view showing the rim ends disconnected and particularly illustrating the connecting lever employed between the rim ends, Figure 3 is a detail edge elevation showing the connecting lever detached, and Figure 4 is a fragmentary sectional view on a somewhat enlarged scale, this view particularly bringing out the normal position of the connecting lever.

My improved rim may be of any general approved type as, for instance, a channel rim as shown in the drawings, or a clincher rim. The rim is formed of a plurality of sections 10, 11 and 12, and while I have shown the use of three sections in constructing the rim still, as will be readily appreciated, the number of sections employed may be varied as desired. Riveted or otherwise secured to the inner faces of the rim sections at the junctions of the sections 10 and 11 with the section 12, are hinge plates 13 provided with mating hinge loops through which are fitted suitable pivot pins swingingly connecting the sections. This construction provides a very effective arrangement for connecting the sections, but if preferred, however, the hinge loops may be formed directly on the rim sections to receive the pivot pins for thus swingingly connecting the sections.

Formed on the free end of the section 10 are spaced hinge loops 14, between which the rim base is notched back somewhat. These hinge loops receive a transverse pivot pin 15 and swingingly mounted upon said pin is a connecting lever 16. Adjacent its outer end the lever is laterally offset outwardly to define a thickened head 17 which fits freely within the notch in the rim base and receives the pivot pin 15 therethrough to swingingly support the lever upon the pin. Extending from the head 17 is a forwardly directed hook 18 of a width corresponding to the width of the lever and provided at its free end with a laterally and inwardly directed bill or cam lug 19 which stands oblique to the body or shank of the hook, the lug inclining forwardly and inwardly from the shank. Projecting from the forward end of the head 17 in spaced parallel relation to the hook shank is a stop lug 20. Associated with the lever 16 is a catch 21 swingingly secured to the inner face of the rim section 10 and adapted to engage at its free end beneath the free end of the lever for locking the lever in active position. The rim section 11 is, at its free end, provided in its base with a medial transverse notch 22 corresponding in width to the width of the hook 18 and extending transversely of the base of the rim section in spaced parallel relation to this notch and registering therewith is a slot 23, this slot corresponding in length to the width of the lug 19. Between the slot 23 and notch 22 the rim base is depressed to form a seat or socket 24.

Assuming now that the free ends of the rim sections 10 and 11 are disconnected as shown in Figure 2, it will be seen that these sections may, as shown in dotted lines in Figure 1, be swung inwardly upon the section 12 and thus disengaged from a tire upon the rim. Consequently, the tire may be easily displaced from the rim. In mounting a tire upon the rim, the tire is first properly fitted around the rim when the sections 10 and 11 are, at their free ends, swung outwardly to abut the inner face of the tire.

With the lever in the position shown in Fig. 2, if the end of the section 11 be brought against the hook 18, the stop lug 20 will bear against the inner face of said section and the hook will pass through the notch 22 in the end of the same. The hook will thus coact with the end walls of the notch for holding the ends of the sections against transverse movement with respect to each other and, when the free end of the lever is then swung outwardly toward the inner face of the section 10, will guide the free ends of the sections in register. As the free end of the lever is thus swung outwardly, the stop lug 20 will, as will be seen, bear against the inner face of the section 11 for sustaining this section with respect to the section 10 while the hook 18 will rock within the notch 22 so that the lug 19 will be consequently moved into the slot 23 while the hook shank will be shifted into the seat 24 therefor. Thus, as the free end of the lever approaches the limit of its outward movement, the inner face of the lug 19 will be brought into coacting relation with the outer side edge of said slot so that under continued outward movement of the lever to active position seating flat against the inner face of the section 10, as shown in Figure 1, the said lug will coact with the outer side edge of said slot and hold the rim sections together. At the same time, the head 17 of the lever will be moved to engage within the notch 22 while the hook shank will seat snugly within the socket 24 lying flush with the outer face of the rim body. In the active position of the lever 16 the sections 10 and 11 will be supported to complete the annular contour of the rim and to prevent accidental separation of the sections, the catch 21 is swung to engage beneath the free end of the lever so that the lever will thus be locked against movement to in turn lock the rim ends together. Transverse movement of the abutting ends of the sections 10 and 11 with respect to each other will be prevented by the coaction of the lug 19 of the lever with the end walls of the slot 23 as well as by the coaction of the head 17 with the end walls of the notch 22. Outward radial movement of the free end of the section 10 relative to the free end of the section 11 as well as inward radial movement of the free end of the section 11 relative to the free end of the section 10 will be prevented by the presence of the stop lug 20 beneath the free end of the section 11. Conversely, inward movement of the free end of the section 10 relative to the free end of the section 11 as well as outward movement of the free end of the section 11 relative to the free end of the section 10 will be prevented by the engagement of the hook 18 over the free end of the section 11. The lever 16 will thus rigidly connect the free ends of the sections 10 and 11, locking the sections in juxtaposition so that the lug 19 will be firmly held against disengagement from within the slot 23 to free the sections. Consequently, under all ordinary circumstances, the rim will efficiently support a tire, although there is sufficient clearance between the section 11 and the lug 20 in the locked position to permit the proper movement of the lever in collapsing or spreading the rim. In order to dismount the tire from the rim it will simply be necessary to release the catch 21 when the free end of the lever 16 may then be swung inwardly to disconnect the meeting ends of the sections 10 and 11 of the rim.

Having thus described the invention, what is claimed as new is:

1. A collapsible wheel rim including a split rim body provided in one end portion thereof with an opening, a connecting lever swingingly mounted upon the opposite end portion of said rim body and movable to engage in said opening and connect the ends of the rim body, overlying the outer face of said first-mentioned end portion of the rim body and confronting the inner face of said second-mentioned end portion of the rim body, and means carried by the lever to oppose inward movement of the first-mentioned rim end away from the lever.

2. A collapsible wheel rim including a split rim body having its ends free with respect to each other and provided in one end portion thereof with an opening, and a lever carried by the opposite end portion of said rim body and movable to engage at its outer end in said opening and connect the ends of the rim overlying the outer face of said first-mentioned end portion of the rim body and at its inner end confronting the inner face of said second-mentioned end portion of the rim body.

3. A collapsible wheel rim including a split rim body provided in one end portion thereof with a notch and in spaced relation to said notch with an opening, and a lever mounted upon the opposite end portion of the rim body and movable to active position fitting in said notch and engaging in said opening, overlying the outer face of said first-mentioned end portion of the rim body and confronting the inner face of said second-mentioned end portion of the rim body.

4. A collapsible wheel rim including a split rim body provided in one end portion thereof with a notch and in spaced relation to said notch with an opening, a lever mounted upon the opposite end portion of the rim body and movable to active position fitting in said notch and engaging in said opening, overlying the outer face of said first-mentioned end portion of the rim body and confronting the inner face of said second-mentioned end portion of the rim body, and stop means carried by the lever to coact with the inner face of said first-mentioned end portion of the rim body adjacent said notch.

5. A collapsible wheel rim including a split rim body provided in one end portion thereof with an opening, and a lever mounted upon the opposite end portion of the rim body and provided at its outer end with a hook, the lever being movable to confront the inner face of said second-mentioned end portion of the rim body and having said hook engaged in said opening, overlying the outer face of said first-mentioned end portion of the rim body for connecting the ends of the rim body.

6. A collapsible wheel rim including a split rim body provided in one end portion thereof with an opening, a lever mounted upon the opposite end portion of the rim body and provided at its outer end with a hook, the lever being movable to confront the inner face of said second-mentioned end portion of the rim body and having said hook engaged in said opening, overlying the outer face of said first-mentioned end portion of the rim body for connecting the ends of the rim body, and a stop lug carried by the lever beneath said hook to coact with the inner face of said first-mentioned end portion of the rim body.

7. In combination, a split tire rim adapted to have its ends moved into overlapping relation when moved out of alinement with each other, a lever having a handle and a fastening portion apertured near the end of the fastening portion, a pintle secured to one end of the rim and extending through the apertured portion of the lever, said rim adjacent its other end being offset to form a depression in its outer face that opens outwardly of said end and adapted to receive the fastening portion of the lever when the handle portion is in engagement with the inner face of the rim, said rim having an opening in communication with the depression, and a shoulder formed on the end of the fastening portion of the lever and adapted to extend into said opening when the lever is in one position and to engage the second named end of the rim when said lever is in another position.

In testimony whereof I affix my signature.

WILLIAM E. MILLER. [L. S.]